United States Patent

[11] 3,623,545

| [72] | Inventor | Balthasar H. Pinckaers<br>Edina, Minn. |
|---|---|---|
| [21] | Appl. No. | 55,321 |
| [22] | Filed | July 16, 1970 |
| [45] | Patented | Nov. 30, 1971 |
| [73] | Assignee | Honeywell Inc.<br>Minneapolis, Minn. |

[54] AUTOMATIC CHANGEOVER HEATING-COOLING SYSTEM HAVING SINGLE SEMICONDUCTOR ANTICIPATOR FOR BOTH HEATING AND COOLING
6 Claims, 1 Drawing Fig.

[52] U.S. Cl. ................................................ 165/26,
165/26, 219/511, 307/39, 236/1, 236/68
[51] Int. Cl. ....................................................... G05d 23/30
[50] Field of Search ............................................ 236/1 E, 68
B, 78 D, 78, 1 C; 219/511, 501; 165/26; 307/310, 39

[56] References Cited
UNITED STATES PATENTS

| 3,445,632 | 5/1969 | Lewis | 219/511 |
| 3,413,438 | 11/1968 | Gardner et al. | 219/501 |
| 2,299,163 | 10/1942 | McGrath | 236/68 |
| 2,935,657 | 5/1960 | Thunberg, Jr. | 236/68 B X |
| 3,284,002 | 11/1966 | Edelman et al. | 236/1 |

Primary Examiner—William E. Wayner
Attorneys—Lamont B. Koontz and Omund R. Dahle

ABSTRACT: A modulating type of thermostat controls an automatic changeover heating-cooling temperature-regulating system that sequentially adds units of cooling or units of heating as called for by the thermostat. The modulating thermostat utilizes a thermistor type of temperature sensor to control a bridge circuit and amplifier. The thermostat includes a heat anticipator in the form of a semiconductor current-carrying means such as a Zener diode that is in heat exchange relationship with the temperature sensor. The semiconductor current-carrying means acts as a constant voltage drop regardless of the amount of current flowing therethrough so that the heating effect of the semiconductor means is a linear function of the amount of current flowing therethrough. This semiconductor element provides the anticipation for both heating and cooling, the element being biased with an intermediate current at the control system dead band between heating and cooling, the current therethrough being reduced as cooling is required and increased as heating is required.

PATENTED NOV 30 1971  3,623,545
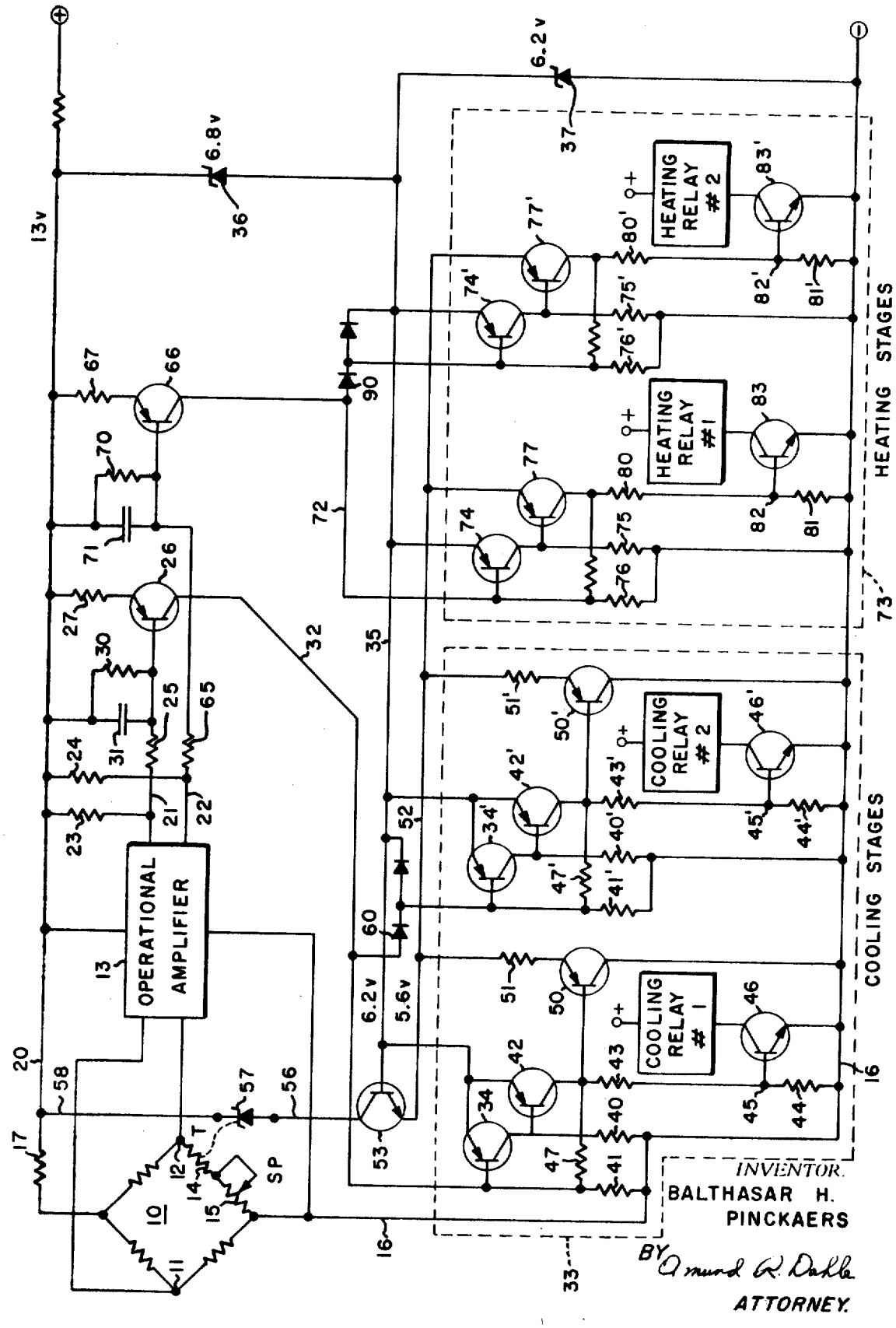
INVENTOR.
BALTHASAR H. PINCKAERS
BY Amund R. Dahle
ATTORNEY.

3,623,545

AUTOMATIC CHANGEOVER HEATING-COOLING SYSTEM HAVING SINGLE SEMICONDUCTOR ANTICIPATOR FOR BOTH HEATING AND COOLING

BACKGROUND OF THE INVENTION

The present invention finds utility in the field of automatic changeover heating-cooling temperature controls.

SUMMARY OF THE INVENTION

The present invention is directed to an anticipation means for a thermostat which is used in an automatic changeover heating-cooling temperature-regulating system. When a thermostat is applied to control a multistage step type of heating-cooling temperature-regulating system it is desirable to have a single heat anticipator in the thermostat which yields a level of heat anticipation that corresponds in an inverse linear fashion to the number of cooling stages that are energized and in a linear fashion to the number of heating stages that are energized.

BRIEF DESCRIPTION OF THE DRAWING

The single FIGURE of the drawing if a schematic representation of the control for a multistage heating-cooling, automatic changeover system.

DESCRIPTION OF THE PREFERRED EMBODIMENT

The drawing discloses a bridge circuit 10 having output terminals 11 and 12 which are connected to the input of an operational amplifier 13. The bridge includes a temperature-responsive element or thermistor 14 in one of the legs thereof as well as a set point potentiometer 15. One bridge input terminal is directly connected to a negative supply conductor 16, the other input terminal being connected through a resistor 17 to a positive supply conductor 20. The operational amplifier has outputs 21 and 22 one of which is activated when the bridge is unbalanced in a first direction and the other of which is activated when the bridge is unbalanced in the opposite direction. These output signals are proportional to bridge error. Amplifier 13 has a dead band at bridge balance at which both outputs are at their null point, that is, at a high voltage relative to conductor 16 as provided by the bias resistors 23 and 24, respectively. However then there is negligible voltage drop across resistors 23 and 24.

The output conductor 21 is connected by means of a current-limiting resistor 25 to the base electrode of a transistor 26. The emitter of transistor 26 is connected by means of a resistor 27 to the positive supply line 20, and the base electrode is connected to the supply line 20 by means of a resistor 30, which is paralleled by capacitor 31. The collector output electrode of transistor 26 is connected by means of a conductor 32 in controlling relation to the cooling stages 33.

Specifically, the collector of transistor 26 is directly connected by the conductor 32 to the base electrode of a transistor 34, the emitter of which is connected to an intermediate potential reference line 35, the potential of which is maintained by a pair of Zener diodes 36 and 37 interconnecting the conductors 20 and 16 with 35. The collector electrode of transistor 34 is connected by means of a resistor 40 to the negative conductor 16 and the base electrode is also connected thereto by a resistor 41. A transistor 42 has its base electrode directly connected to the collector electrode of transistor 34, its emitter connected to conductor 35 and its collector electrode connected through resistors 43 and 44 to the conductor 16. A junction 45 between these two resistors is connected to the base electrode of an NPN-transistor 46, the emitter of which is connected to conductor 16 and the collector of which is connected through a load device, here shown as Cooling Relay No. 1, to a positive supply source. A feedback resistor 47 is connected between the collector electrode of transistor 42 and the base electrode of transistor 34 to provide a positive feedback and cause the operation of these two transistors 34 and 42 to be snap-acting.

The collector electrode of transistor 42 also connects to the base electrode of a PNP transistor 50, the collector of which is directly connected to the negative conductor 16 and the emitter of which is connected through a current-limiting resistor 51 and a conductor 52 to the emitter electrode of an NPN-transistor 53. The base electrode of transistor 53 is stabilized in potential by being connected to the conductor 35 and the collector thereof is connected through a conductor 56, a Zener diode 57, which is the anticipating heater for both heat and cooling stages, and through a conductor 58 to the positive conductor 20. The Zener diode 57 is located in heat exchange relationship with the temperature sensor 14, and when current is drawn through the diode 57 the heat generated by this current flow is transferred to the sensor 14 and thus provides heat or cool anticipation.

The second stage of cooling is similar to that described immediately above and carries the same identifying numerals in the electronic components except that each such numeral is primed. Thus, for example, the collector electrode of transistor 26 is connected by means of a conductor 32 and a diode 60 to the base electrode of the PNP-transistor 34'. Diode 60 provides a voltage pedestal so that to operate cooling relay No. 2 requires a larger signal on conductor 32 than does the first cooling stage. Multiple stages of cooling are thus added sequentially as the error signal increases.

The output line 22 from the operational amplifier is connected by means of a resistor 65 to the base electrode of a PNP-transistor 66, the emitter of which is connected through a resistor 67 to the positive lead 20. The base electrode is also connected by means of a biasing resistor 70, which is paralleled by a capacitor 71, to the conductor 20. The collector electrode or output electrode of transistor 66 is connected in controlling relation to the heating stages 73. Specifically, the conductor 72 connects the collector electrode of transistor 66 to the base electrode of a transistor 74, the emitter electrode of which is directly connected to the conductor 35 and the collector electrode of which is connected by a resistor 75 to the negative conductor 16. The base electrode of transistor 74 is further connected through a biasing resistor 76 to the negative conductor 16. A transistor 77 has its base electrode directly connected to the collector electrode of the transistor 74, the emitter of transistor 77 being connected to the conductor 52 and the collector thereof being connected through resistors 80 and 81 to the negative conductor 16. A junction 82 between the resistors 80 and 81 is directly connected to the base electrode of an NPN-transistor 83, the emitter of which is connected to the conductor 16 and the collector of which is connected through a load device, here shown as heating relay No. 1, to a source of positive potential. The heating section 73 is disclosed as a two-stage heating control and the second stage carries the same identifying numerals as the first stage described immediately above except that the numerals carry a prime designation. The collector electrode of transistor 66 is further connected through the diode 90 to the control electrode of transistor 74' to thereby control the second stage of heating. The diode 90 causes the second heating relay to require a larger signal on conductor 72 before operating than does the first heating stage.

In considering the operation of an automatic changeover heating-cooling apparatus, it will be noted that at a satisfied condition, that is, with the bridge substantially balanced so that neither heating nor cooling is being demanded, an intermediate level of current is caused to flow through the Zener diode 57 as will be described in further detail below. Under these balanced conditions, the operational amplifier 13 does not provide an output on either output conductors 21 or 22. This means that the output potentials on conductors 21 and 22 are relatively high approaching the positive supply potential on conductor 20. If the temperature in the area being sensed begins to fall, thus signaling a requirement for heat, a negative-going ramp voltage appears on output conductor 22, the magnitude of change in output voltage being a function of the magnitude of sensed temperature error. If on the contrary the temperature of the area being controlled becomes too warm causing a bridge unbalance in the opposite sense, a negative-going ramp voltage appears on the output conductor 21. Thus it may be seen that under satisfied conditions with neither heating nor cooling being required, the output potentials on both conductors 21 and 22 is high and the transistors 26 and 66 are nonconductive.

When transistor 26 is nonconductive, the transistor 34 in the first cooling stage is conductive, transistors 42 and 46 are nonconductive and transistor 50 is rendered conductive. Similarly, in cooling stage 2 transistors 34' and 50' are conductive and the transistors 42' and 46' are nonconductive. Under this set of conditions the current paths which set up the intermediate current for the Zener diode anticipating heater can be clearly seen. A current path may be traced from the reference potential line 35 through transistor 53 from base to emitter, lead 52, current-limiting resistor 51, through the conductive transistor 50 to the negative terminal 16. Likewise a parallel current may be traced from the conductor 52 through current limiting resistor 51', and the conductive transistor 50' to the negative conductor 16. The magnitudes of resistors 51 and 51' determine the current flowing in transistor 53. Since the collector current flowing in transistor 53 is substantially the same as the emitter current, the current flowing through Zener diode 57 is thereby determined.

If the temperature in the area being regulated now becomes warmer than the set point, the operational amplifier receives an unbalance signal from the bridge and provides an output on conductor 21 thereby causing transistor 26 to begin to conduct current which flows through conductor 32 and resistor 41 and tending to reduce the conduction of transistor 34. At a predetermined level of bridge unbalance, the current flowing in conductor 32 is sufficient to cause transistor 34 to be turned off and transistor 42 to be turned on. The positive feedback occurring through resistor 47 causes this change to be a switching action. As soon as transistor 42 becomes conductive, the transistor 46 is also rendered conductive thereby energizing the cooling relay No. 1 which in turn controls the first stage of refrigeration apparatus for the area being temperature regulated. At the same time for formerly conductive transistor 50 is turned off thereby reducing the emitter flowing in transistor 53 and thus reducing the current flowing through the anticipator Zener diode 57.

If the temperature of the area being regulated continues to se with the first stage of refrigeration being actuated, the bridge unbalance will increase causing transistor 26 to be rendered further conductive. As the potential on conductor 32 continues to become more positive, a further current will be caused to flow through diode 60 and resistor 41' whereupon the same circuit action described immediately above will occur and cooling relay No. 2 will become energized also. At this point transistor 50' will be turned off thus reducing further the emitter current flowing in transistor 53 and still further reducing the current flowing in the Zener anticipator 57. Two stages of cooling have been shown, however, one stage or more than two may be utilized as desired. The zener diode maintains a substantially constant voltage drop thereacross over a wide range of current so that the power or heat dissipation of the the zener diode is a linear function of the current through it, and not a function of current to the second power as would occur if the element were resistive in nature. If extending an extra wire to the thermostat is not objectionable, the transistor 55 may be placed in the thermostat as the heat anticipation element replacing the Zener diode 57 which the is not used. The transistor provides the same linear relation of heat output to current as does the Zener diode.

When heating rather than cooling is required, the bridge unbalance in the opposite direction results in an output signal on conductor 22 which causes normally off transistor 66 to become conductive. As a result a current flows through conductor 72 and resistor 76 and at a predetermined level of this current the normally conductive transistor 74 is turned off, transistors 77 and 83 are turned on and the heating relay No. 1 is energized to control suitable heating equipment, not shown. With transistor 77 being rendered conductive, an additional current path through the transistor 77 and resistors 80 and 81 cause the intermediate level of current in transistor 53 to be increased above that level. This in turn causes the current through Zener diode 57 to be increased thus causing an increased heat to be transmitted to sensing element 14. If the system indicates that additional heat is required, the increasing conductivity of transistor 66 causes current to flow through diode 90 and resistor 76' to also activate the heating relay no. 2. With transistor 77' becoming conductive a fourth current path is provided in the emitter circuit of transistor 53 increasing the current therethrough still further and providing a still increased current through the anticipator 57. The multistage heating portion of the system herein described is similar to that described in my copending application Ser. No. 834,287, filed June 18, 1969 and entitled "Thermostat with Linear Heat Anticipator Means."

The embodiments of the invention in which an exclusive property or right is claimed are defined as follows:

1. In an automatic changeover heating-cooling temperature-controlling system for controlling area cooling means and area heating means:
   sensing circuit means comprising temperature-responsive means exposed to the area to be controlled and providing an output indicative of the sensed temperature;
   circuit means adapted to connect said temperature-sensing means in controlling relation to the cooling means and to the heating means;
   linear heat output current-carrying means connected to said circuit means, said linear heat output current-carrying means being in thermal heat exchange relation with said sensing means and functioning as a heat and cool anticipator;
   and control means in said circuit means providing a predetermined level of current flow through said linear heat output current-carrying means during balanced conditions when neither heating nor cooling is required, and providing a decreased current therethrough when said area cooling means is operative and an increased current therethrough when said area heating means is operative.

2. The system in accordance with claim 1 wherein said sensing means is a resistive network including a temperature-responsive resistor.

3. The system in accordance with claim 1 wherein said linear heat output current-carrying means is a semiconductor current-carrying means.

4. The system in accordance with claim 3 wherein said semiconductor current-carrying means comprises at least one semiconductor diode.

5. The system in accordance with claim 4 wherein said semiconductor diode is a Zener diode.

6. The system in accordance with claim 1 wherein said area cooling means is a multistage sequentially operated means and said area heating means is a multistage sequentially operated means controlled by said circuit means so that with the energization of each successive cooling stage the control means is effective to reduce the current to said linear heat output current-carrying means and with the energization of each successive heating stage the control means is effective to increase the current to said linear heat output current-carrying means.

* * * * *